United States Patent [19]

Muehl

[11] Patent Number: 4,555,041
[45] Date of Patent: Nov. 26, 1985

[54] TANK VALVE APPARATUS

[76] Inventor: Herman D. Muehl, 10851 Drury La., Lynwood, Calif. 90262

[21] Appl. No.: 632,714

[22] Filed: Jul. 20, 1984

[51] Int. Cl.[4] ............... F16K 17/196; F16K 17/36
[52] U.S. Cl. .................................. 220/204; 137/43; 137/493.3; 220/202; 220/324; 220/327
[58] Field of Search ............... 137/38, 39, 43, 493.3; 220/202, 203, 204, 314, 324, 327

[56] References Cited

U.S. PATENT DOCUMENTS

| | | | |
|---|---|---|---|
| 2,183,448 | 12/1939 | Drane | 137/493.6 X |
| 3,339,791 | 9/1967 | DeFrees | 220/203 X |
| 3,351,497 | 11/1967 | Lucas | 137/43 X |
| 4,000,828 | 1/1977 | Crute | 220/203 X |
| 4,508,131 | 4/1985 | DeFrees | 137/43 |

FOREIGN PATENT DOCUMENTS 856053 11/1970 Canada ........................ 220/202

Primary Examiner—Robert G. Nilson
Attorney, Agent, or Firm—Fulwider, Patton, Rieber, Lee & Utecht

[57] ABSTRACT

Tank valve apparatus providing the usual functions of excessive pressure venting and relief of normal over pressure and negative pressure conditions, and also adopted to instantaneously close the venting system on tanker truck rollover. This is done by an inertia valve which remains closed until the vehicle is righted. The apparatus also includes gravity sensitive flap closures which pivot to a position blocking large fuel surges against the tanker dome cap on vehicle rollover.

8 Claims, 11 Drawing Figures

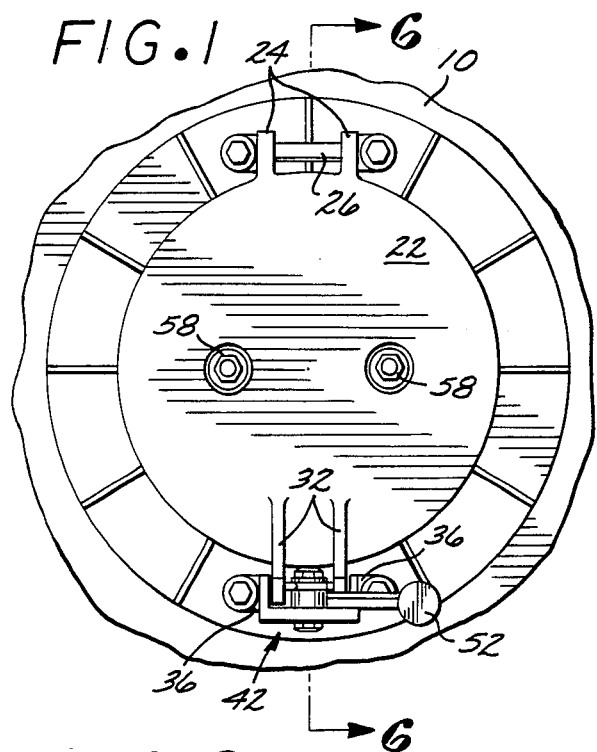
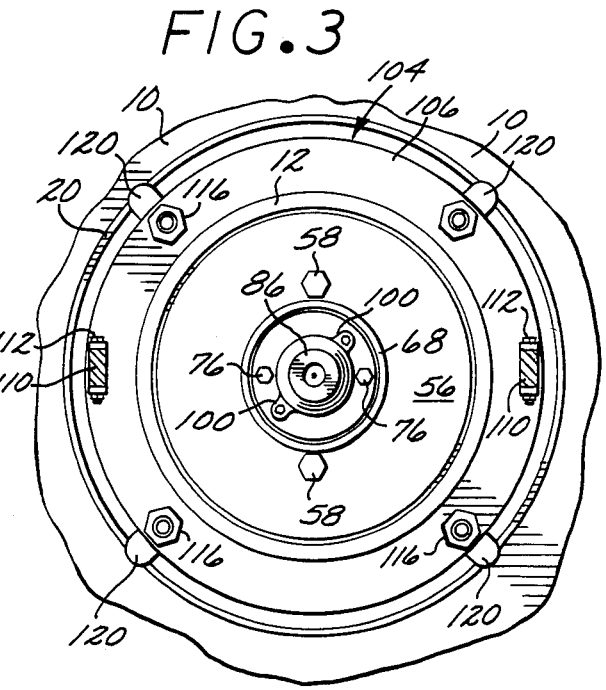
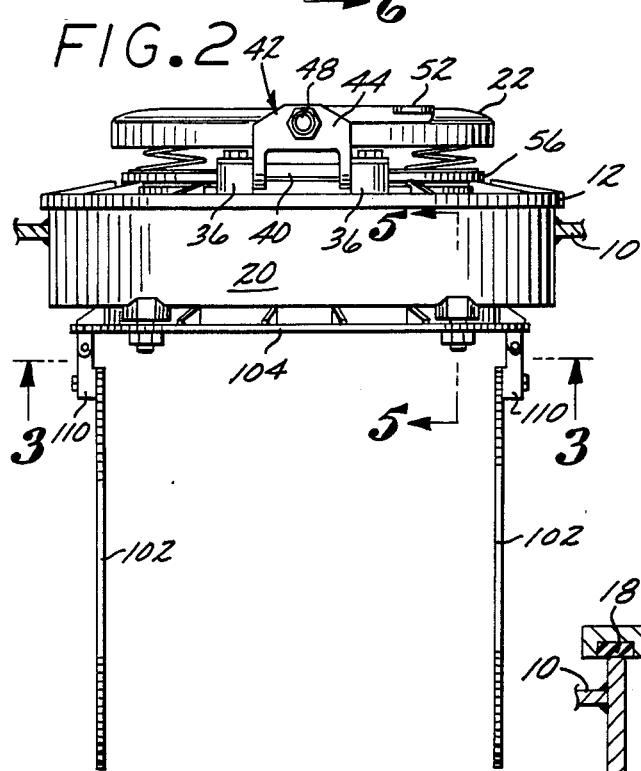
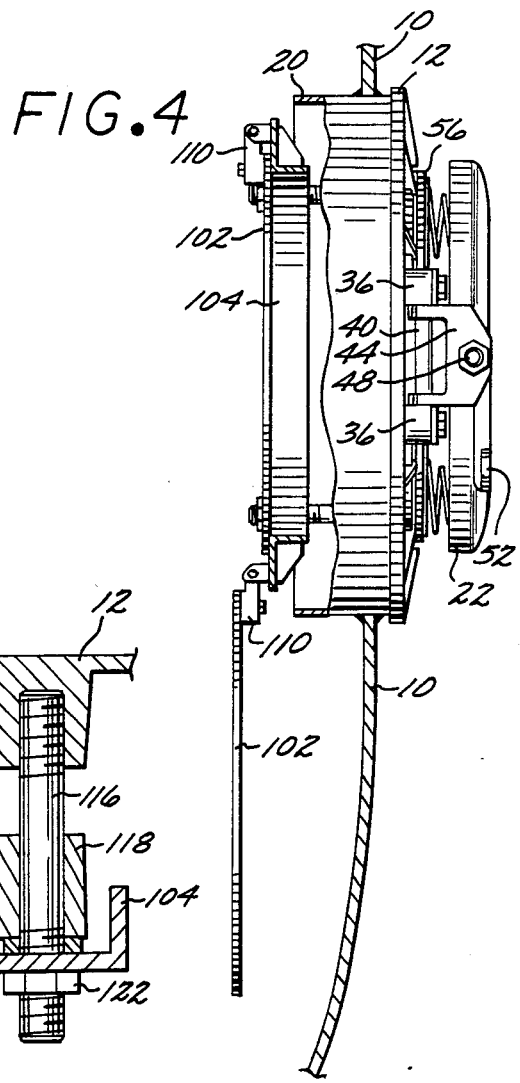

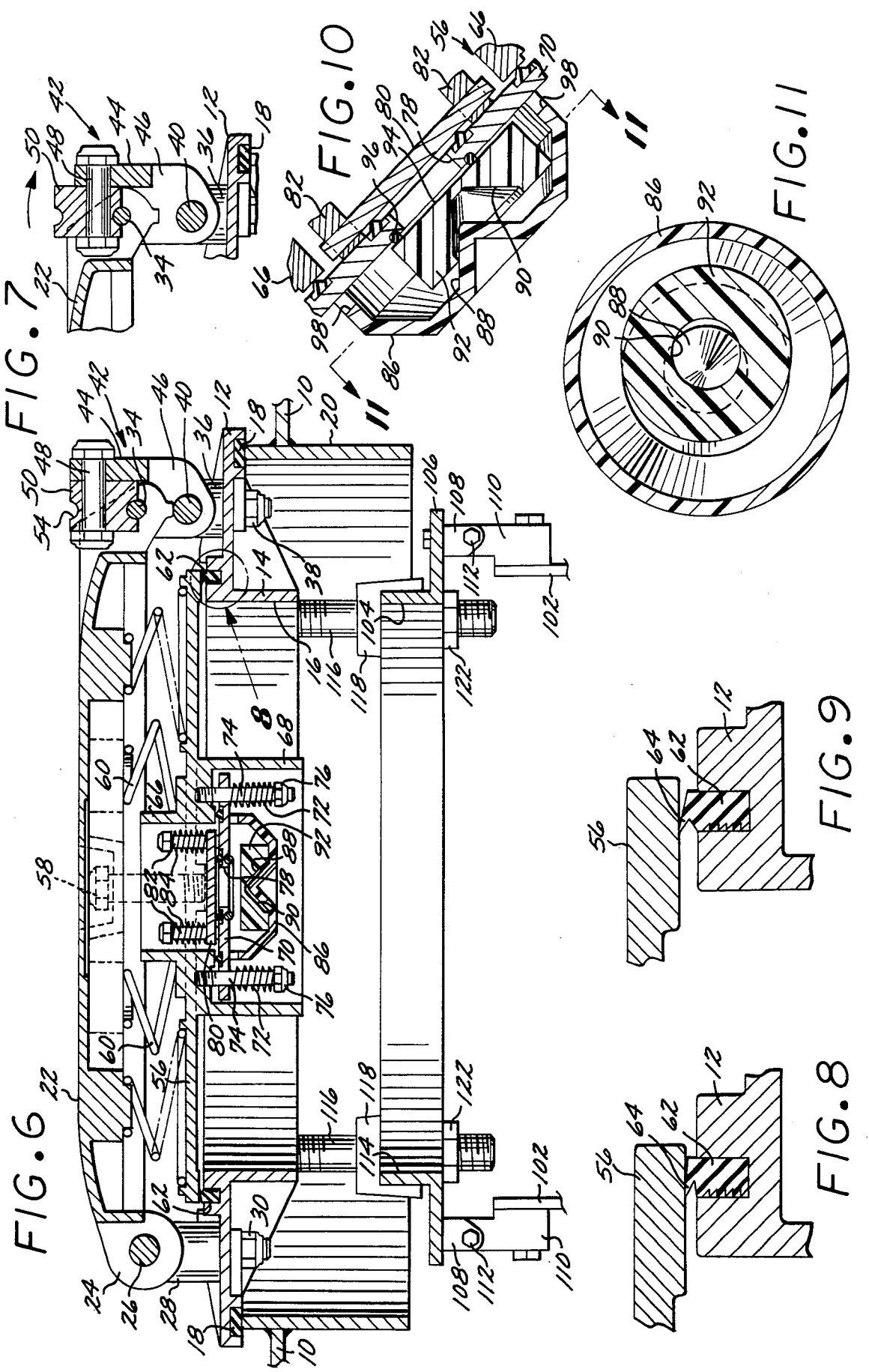

TANK VALVE APPARATUS

BACKGROUND OF THE INVENTION

1. Field of the Invention

The present invention relates to a tank valve apparatus, and particularly to a tank valve apparatus, for a tanker truck or the like.

2. Description of the Prior Art

Tank valve apparatus for fuel tanker trucks typically provides adequate internal venting of the tank at all times, as required by Federal and many state regulations. In addition, such apparatus operates to provide much more rapid venting in the event that excessive or explosive pressures develop in the tank. Such venting is particularly important during rapid filling of the tank. Equally importantly, such valve apparatus operates to admit air during rapid discharge of fuel to prevent collapse of the tank. However, the prior art mechanisms available to accomplish the foregoing are often complex in construction and operation, and consequently are expensive, difficult to operate and characterized by high maintenance costs and sometimes short service life. Some are even unreliable by reason of their complexity or faulty design.

An unfortunate consequence of the high speed transport of fuel and similar product in tanker trucks operating on crowded highways is the increasing incidence of accidents in which the tanker truck rolls over. Prior valve apparatus is ineffective in such instances to seal the tank against fuel spillage and the sometimes catastrophic release of large quantities of fuel.

It has been found that on tank rollover there is a very sudden liquid surge which in as little as two milliseconds develops internal pressures in the order of fifty pounds per square inch, which persists for approximately fifty milliseconds. No adequate means is available for reducing the sudden effect of such a liquid surge, which has resulted in blowing the manhole or dome cover assembly completely off the tank, and thereby releasing large quantities of fuel through the large opening that results.

In those instances where the dome assembly has held in such rollovers, significant quantities of fuel are sprayed out through the vent valve system, creating a highly inflammable fuel fog in the vicinity. Prior art vent systems are either not capable of closing at all under such conditions, or they react too slowly to the rapidly rising tank pressures to close before a great deal of fuel is sprayed out.

SUMMARY OF THE INVENTION

According to the present invention, a tank valve apparatus is provided which is adapted to provide all the usual functions of excessive pressure venting, and venting to accommodate lesser or normal positive pressures, as well as relieving negative pressures or partial vacuum. This is accomplished by means of a compact, rugged, reliable and easily assembled and operated arrangement of interactive valve elements.

The apparatus includes a dome cap carried by a dome bridge for pivotable movement into and out of overlying relation to a dome opening. The dome cap is normally biased to its closed position against a unique gasket which is sufficiently resilient to remain engaged with the dome cap throughout a predetermined range of movement of the dome cap. Consequently, venting of excessive tank pressure through the relatively large dome opening does not occur until the upper limit of such movement is reached. Typically, dome cap movement begins at approximately three pounds per square inch internal tank pressure, with venting occurring at approximately five pounds per square inch.

Normal or usual venting occurs through a smaller negative pressure opening provided in the dome cap. A vacuum valve is movable against a bias means and away from the negative pressure opening to relieve any partial vacuum developed in the tank. The vacuum valve, in turn, includes a vent or positive pressure opening which is normally closed by a biased pressure valve carried by the vacuum valve. All of the foregoing elements are compactly arranged for easy assembly and mounting.

The present valve apparatus also includes unique means for instantaneously closing the positive pressure opening on tank truck rollover to prevent dangerous spraying of fuel through the opening. This is accomplished by an inertia valve which is inertia slidable over the surfaces of a carrier which supports it adjacent the positive pressure opening. The sliding movement occurs in any orientation of the vehicle on rollover.

In addition, the extreme high loading of the manhole or dome assembly which often occurs on vehicle rollover due to liquid surge is largely eliminated by harnessing the force of gravity and the vertical forces developed on rollover. Flap means, preferably a pair of flaps, are suspended from a mounting arrangement which is located below the dome opening and which defines a discharge opening approximating the size of the dome opening. On rollover, one of the flaps, depending on the direction of rollover, is pivoted by gravity and inertia forces to a position overlying and closing the discharge opening. This prevents any large surge of fuel toward and against the dome cap.

Integrity of securement of the dome bridge and dome cap is also assured by a handle locking means which requires deliberate pivotal movement about two different pivot axes to release the dome bridge and cap.

Other objects and features of the invention will become apparent from consideration of the following description taken in connection with the accompanying drawings.

BRIEF DESCRIPTION OF THE DRAWINGS

FIG. 1 is a top plan view of the tank valve apparatus according to the present invention;

FIG. 2 is a side elevational view of the apparatus of FIG. 1;

FIG. 3 is a view taken along the line 3—3 of FIG. 2;

FIG. 4 is a view similar to FIG. 2, but illustrating the position of the apparatus on tanker truck rollover, with one of the closure flaps in its closed position;

FIG. 5 is an enlarged view taken along the line 5—5 of FIG. 2;

FIG. 6 is an enlarged view taken along the line 6—6 of FIG. 1;

FIG. 7 is a detail view of the handle operated locking means in its partially released position, as compared to its locking position in FIG. 6;

FIG. 8 is an enlarged detail view taken along the line 8 in FIG. 6, illustrating engagement of the dome cap seating gasket by the dome cap in one position of the dome cap;

FIG. 9 is a view similar to FIG. 8, but illustrating continued engagement between the dome cap and the dome cap seating gasket in a slightly raised position of the dome cap;

FIG. 10 is a transverse cross-sectional view of the inertia valve in its seated, rollover position; and FIG. 11 is a view taken along the line 11—11 of FIG. 10.

DESCRIPTION OF THE PREFERRED EMBODIMENT

Referring now to the drawings, there is illustrated a tank valve apparatus adapted to provide all of the usual venting functions to accommodate normal venting, as well as venting of excessive pressures. In addition, as will be seen, the apparatus is uniquely adapted to provide a barrier to surging of liquid products such as fuel on rollover of a tanker truck, and to automatically and instantaneously seal off the positive pressure opening or vent under such circumstances to prevent escape of fuel.

The tank valve apparatus is illustrated in the various figures as it would appear mounted to the edge margins in the opening of the top of the tank 10 of a tanker truck or the like.

The tank valve apparatus includes a dome mounting means which includes a circular dome mount 12 having a central cylindrical axially oriented skirt or base ring 14 which defines a central dome opening 16. The underside of the circumferential margin of the dome mount 12 includes an annular recess which mounts a gasket 18 for engagement with the upper margin on an axially oriented cylindrical welding ring 20 which is welded in sealed relation to the edge margins of the circular opening into the tank 10. As will be seen, the present tank valve apparatus is completely separable from the welding ring 20 for inspection and maintenance.

The dome mount 12 includes a circular cover or dome bridge 22 which is pivotable into and out of overlying relation to the dome opening 12. Such pivotable mounting is afforded by a trunnion assembly defined a pair of hinge knuckles 24 integral with the dome bridge 22 and carrying a hinge pin 26 which is rotatably supported at its extremities by a pair of trunnions 28 rigidly secured to the dome mount 12 by usual nut and bolt assemblies 30.

A second trunnion assembly is located opposite the foregoing trunnion assembly and comprises outwardly directed and spaced apart hinge knuckles 32 integral with the dome bridge 22 and mounting a lock shaft 34, as best seen in FIG. 6

A pair of spaced apart trunnions 36 are integrally attached to the dome mount 12 by a pair of usual nut and bolt assemblies 38, each of the trunnions 36 mounting the opposite extremities of a trunnion shaft 40.

Handle operated locking means 42 are carried by the trunnion shaft 40 for engagement with the lock shaft 34 to lock the dome bridge 22 in the closed position illustrated in FIG. 6. For this purpose, the locking means 42 includes an eccentric mount 44 having a pair of depending legs provided with openings which receive the trunnion shaft 40 for pivotal movement of the mount 44 about the axis of the trunnion shaft 40.

The midportion of the mount 44 carries a pivot pin 48 which defines a pivot axis located above and transversely of the axis of the trunnion shaft 40. A generally circular cam or eccentric 50 is mounted off center for pivotal movement about the axis of the pin 48. The eccentric 50 rigidly mounts an outwardly extending handle 52 for effecting such pivotal movement of the eccentric 50.

The eccentric 50 includes a circumferential groove or recess 54 adapted to closely receive the lock shaft 34 of the dome bridge 22.

The dome bridge 22 is illustrated in its fully locked position in FIG. 6. To release the dome bridge 22, the handle 52, as seen in FIG. 1, is pivoted in a counterclockwise direction to a position to the left of that illustrated. This raises the larger off center portion of the eccentric 50 to the position of FIG. 7, allowing the lock shaft 34 and associated dome bridge 22 to rise with it, which is a result of a biasing action against the cover 22, as will be seen. This constitutes a partial release position of the dome bridge 22. To fully release the dome bridge 22, the mount 44, together with the associated eccentric 50 is pivoted in a clockwise direction, as seen in FIG. 7, and as designated by the arrow, so that the eccentric 50 is out of overlying relation to the lock shaft 34, which enables opening movement of the dome bridge 22 in a counterclockwise direction, as view in FIG. 6. This arrangement requires a deliberate movement and operation of the components of the locking means 42 about two different axes of pivotal movement, thereby greatly reducing the chance of inadvertently opening the dome bridge 22.

A circular dome cap 56 is carried by the dome bridge 22 and is characterized by a closed position, illustrated in FIG. 6, in which it is seated across the dome opening 16. The dome cap 56 is movable with the dome bridge 22 throughout any pivotal movement of the dome bridge 22 by virtue of a pair of cap studs 58 located within recesses provided in the upper side of the dome bridge 22, and extending downwardly for threadable mounting within suitable threaded openings provided in the dome cap 56, as illustrated in dotted outline in FIG. 6. The cap studs 58 are vertically movable relative to the dome bridge 22 to permit a limited degree of vertical movement of the dome cap 56 relative to the dome bridge 22.

A plurality of circumferentially arranged compression springs 60 are disposed between the dome bridge 22 and dome cap 56, there opposite extremities being retained in position by suitable spring seats, as will be apparent. The action of the springs 60 is normally to bias the dome cap 56 to its closed position, as seen in FIG. 6. In its closed position the circumferential outer margin of the dome cap 56 is engaged upon dome cap mounting means in the form of a resilient, circumferentially disposed gasket ring 62 which is disposed and held within a suitable circumferential recess provided in the dome mount 12.

As best seen in FIGS. 8 and 9, the gasket ring 62 is characterized by a plurality of circumferential ridges which engage the adjacent surface of the recess to constrain the gasket ring 62 against movement out of the recess. In addition, the gasket ring is characterized by a radially inwardly directed flange or lip 64 which also projects slightly upwardly toward the under surface of the dome cap 56. The lip 64 engages the underside of the dome cap 56 in its closed position, as seen in FIG. 8, sealing off the adjacent dome opening 16. As will be seen, venting of internal pressures in the tank 10 up to approximately one pound per square inch is provided by a separate venting mechanism. However, on build up of internal pressure beyond one pound per square inch, the gasket ring lip 64 will deform to partially vent internal pressures up to approximately three pounds per square inch without fully disengaging the now partially raised dome cap 56, as seen in FIG. 9. Further increases in pressure are quickly and fully relieved by disengagement of the dome cap 56 from the gasket ring lip 64.

The dome cap 56 includes a central, axially oriented and upwardly projecting cylindrical portion 66, and a similar but downwardly directed and larger diameter lower cylindrical portion 68. The portion 66 defines a circular negative pressure opening which is normally closed by a circular plate defining a vacuum valve 70. The valve 70 includes circular recesses seating a circular gasket adapted to sealingly engage the margins of the central opening of the portion 66 to close the negative pressure opening defined by the portion 66.

The valve 70 is biased toward the closed position of FIG. 6 by a plurality of compression springs 72 mounted upon studs 74 threadably mounted at their upper extremities to the dome cap 56. The springs 72 bear against the valve 70 at their upper extremities and, at their opposite extremities, bear against nuts 76 threaded to the lower ends of the studs 74. The valve 70 is freely movable relative to the stud 74 so that the valve 70 is freely movable to its open position against the bias of the springs 72 whenever negative pressures or a partial vacuum develops in the tank 10, thereby admitting air and relieving such internal pressures.

Relatively low positive internal tank pressure is vented through a central positive pressure opening or vent 78 provided in the vacuum valve 70. The upper margins surrounding the vent 78 include an annular recess carrying a circular gasket which is sealingly engaged by a circular plate defining a pressure valve 80.

The pressure valve 80 includes a plurality of mounting openings which receive a pair of studs 82 integrally threaded to and projecting upwardly of the vacuum valve 70. Bias means in the form of compression springs 84 are provided to bias the pressure valve 80 toward its closed position, in a manner similar to the biasing action of the springs 72 against the vacuum valve 70. The springs 84 yield on development of pressures approximately one pound per square inch and the pressure valve 80 rises off its seat to vent internal tank pressure through the vent 78.

As best seen in FIGS. 3 and 6, a bowllike inertia valve carrier 86 is disposed below the vent 78 and includes an outwardly sloping annular outer wall, and an inwardly sloping inner wall defining a central, upwardly directed conical projection 88. The inner and outer walls define carrier guide surfaces. These carrier guide surfaces are complementally engaged by valve guide surfaces formed in a circular, generally cylindrical inertia valve 92. The valve 92 includes a lower face having a circular outer edge, a flat upper face 94, and a conical recess 90 extending upwardly from its circular margin or edge in the valve lower face, as best seen in FIGS. 10 and 11.

The face 94 is engageable with a usual O-ring 96 carried in the underside of the vacuum valve 70 adjacent the vent 78. The circular outer edge of the lower face of the valve 92 and the circular inner edge formed in the lower valve face by the recess 90 define valve guide surfaces which engage, respectively, the carrier guide surfaces of the valve carrier 86 on overturning of the truck. Such engagement constrains the valve 92 against tipping or cocking as it moves into sealing engagement with the O-ring 96.

The valve carrier 86 is cutaway or formed adjacent its upper periphery to define vent passages 98 to afford communication between the tank interior and the vent 78. In addition, a portion of the upper periphery of the carrier 86 includes integral ears or mounting tabs 100 which are attached to the underside of the vacuum valve 70 by any suitable fasteners.

The inertia valve 92 is normally out of engagement with the O-ring 96 so that the vent 78 is open. However, on rollover of the tanker truck, as previously indicated the carrier 86 assumes the position of FIG. 10, and the guide surfaces of the valve carrier 86 smoothly guide the inertia valve 92 toward the O-ring 96. The character of the interengaging valve and valve carrier guide surfaces is such that the valve face 94 is in coplanar relation to the plane of the O-ring 96 in any position of rollover. No auxillary guide means or the like are necessary, and the sealing action of the inertia valve 92 is quick and instantaneous, and the seal remains as long as the rollover condition continues. Consequently, there is an instanteous closure of the vent 78 on rollover, and therefore no possibility for dangerous spraying of fuel through the vent 78.

Sudden loading of the dome mount 12 and its associated components are surging of the liquid in the tank 10 on rollover of the tanker truck is prevented by a pair of circular closures or flaps 102, as best seen in FIGS. 2 and 4. The flaps 102 are pivotally suspended from a flap mounting means in the form of a mounting ring 104 having a radially outwardly projecting flange 106, as also seen in FIG. 6. Lugs 108 secured to the flange 106 mount a pair of brackets 110 for pivotal movement about horizontal axes defined by pivot pins 112. The axis of the pins 112 is preferably aligned with the longitudinal axis of the tanker truck so that the flaps 102 connected to the brackets 110 pivot or swing laterally inwardly and outwardly of the truck, when swinging inwardly, and the other swinging outwardly, as seen in FIG. 4.

The interior of the ring 104 defines a discharge opening 114 relatively large in diameter approximating the diameter of the dome opening 16. On rollover, one of the flaps 102 completely closes and seals off the discharge opening 114, as seen in FIG. 4, so that liquid surge of the contents of the tank 10 toward the dome opening 16 is immediately and substantially completely interrupted.

The means mounting the mounting ring 104 to the dome mount 12 are a part of the same fittings which attach the dome mount 12 to the tank welding ring 20. More particularly, a plurality of circumferentially spaced dome studs 116 are threadedly disposed and thereby fixed within threaded recesses provided in the dome mount 12. A corresponding plurality of L-shape lugs 118 are vertically movably mounted to the studs 116, including radially outwardly projecting legs 120 which engage the lower margin of the welding ring 20, as seen in FIG. 3.

The lower extremities of the dome studs 116 extend freely through suitable openings in the inertia valve mounting ring 104, and a plurality of nuts 122 is threaded onto the dome studs 116 into engagement with the lower margin of the inertia valve mounting ring 104. Tightening the nuts 122 securely attaches the mounting ring 104 to the stud lugs 118, and the lugs 118 to the welding ring 20.

Various modifications and changes may be made with regard to the foregoing detailed description without departing from the spirit of the invention.

I claim:

1. A tank valve apparatus for a tanker truck or the like, said apparatus comprising:
   dome mounting means for securement to a tank to define a dome opening into said tank, and including a dome bridge pivotable into and out of overlying relation to said dome opening;
   a dome cap carried by said dome bridge and having a closed position seated across said dome opening, said dome cap being movable relative to said dome bridge to an open position away from said dome cap opening for excessive pressure venting of said tank, said dome cap including a negative pressure opening;
   bias means interposed between said dome bridge and said dome cap and urging said dome cap into said closed position of said dome cap;
   a vacuum valve carried by said dome cap and having a closed position seated across said negative pressure opening, said vacuum valve being movable relative to said dome cap to an open position away from said negative pressure opening for entry of air into said tank under negative tank pressures, said vacuum valve including a positive pressure opening;
   bias means interposed between said dome cap and said vacuum valve and urging said vacuum valve into said closed position of said vacuum valve;
   a pressure valve carried by said vacuum valve and having a closed position seated across said positive pressure opening, said pressure valve being movable relative to said vacuum valve to an open position away from said positive pressure opening for venting of air from said tank under positive tank pressures;
   an inertia valve carrier carried by said vacuum valve and defining vent passages from said tank to said positive pressure opening, said valve carrier including first guide surfaces directed toward said positive pressure openings; and
   an inertia valve carried by said valve carrier and including second guide surfaces slidable upon said first guide surfaces, upon tilting of said inertia valve carrier, to a closed position sealing off said positive pressure opening.

2. A tank valve apparatus according to claim 1 wherein one of said first and second guide surfaces comprises a conical projection and the other comprises a circumferential edge of a recess receiving said projection.

3. A tank valve apparatus according to claim 1 wherein said first guide surfaces comprise a central conical projection and an outer circumferential wall, and said second guide surfaces comprise an inner circumferential edge formed by a recess receiving said projection, and further comprise an outer circumferential edge engageable with said outer circumferential wall.

4. A tank valve apparatus according to claim 1 and including dome cap seating means carried by said dome cap mounting means adjacent said dome opening, said dome cap seating means comprising a resilient, circumferentially disposed gasket ring having a radially directed circumferential lip engaged upon said dome cap in said closed position of said dome cap and resiliently movable with said dome cap to remain in engagement with said dome cap through a predetermined range of opening movement of said dome cap whereby said dome opening remains sealed by said dome cap through a predetermined range of positive internal tank pressures.

5. A tank valve apparatus according to claim 1 and including first trunnions carried by said dome mounting means and supporting said dome bridge for pivotal movement of said dome bridge and said dome cap between said open and closed positions of said dome cap; a trunnion shaft carried by said dome mounting means opposite said first trunnion means; a lock shaft carried by said dome bridge; and handle operated locking means carried by said trunnion shaft for pivotal movement about the axis of said trunnion shaft, into and out of overlying relation to said lock shaft, said locking means including an eccentric crank pivotable by a handle about an axis transverse to said trunnion axis between a release position lightly engaged upon said lock shaft, and a lock position wherein said eccentric forcibly urges said lock shaft toward said trunnion shaft whereby said dome cap is urged into its closed position.

6. A tank valve apparatus according to claim 1 and including flap mounting means carried by said dome mounting means and defining a discharge opening generally aligned with said dome opening; and a plurality of flaps freely pivotally suspended from said dome mounting means and adapted to pivot and close said discharge opening on any tilting of said flap mounting means resulting from rollover of the tanker truck.

7. In tank valve apparatus for the tank of a tank truck or the like, wherein valve means are provided which define a vent opening, the improvement comprising:
   an inertia valve carrier carried by said valve means adjacent said vent opening and including first guide surfaces directed toward said vent opening and defined by a conical projection; and
   an inertia valve carried by said valve carrier and including second guide surfaces defined by a circular edge formed by a recess and slidable upon said first guide surfaces to a closed position sealing off said vent opening upon tilting of said inertia valve carrier.

8. In tank valve apparatus for the tank of a tank truck or the like, wherein valve means are provided which define a vent opening, the improvement comprising:
   an inertia valve carrier located adjacent said opening and having a central, upwardly directed and sloping conical projection and a circumferential sloping outer wall; and
   an inertia valve carried by said valve carrier and having an upper face, a circumferential outer edge, and a central recess receiving said projection and defining a circular inner edge, said outer edge and inner edge slidably engaging said outer wall and said projection, respectively, whereby, upon tilting of said valve carrier on truck turnover, said valve is slidable along a sloping path toward said vent opening to a closed position wherein said upper face is adjacent said vent opening for sealing off said vent opening.

* * * *